Figure 1:
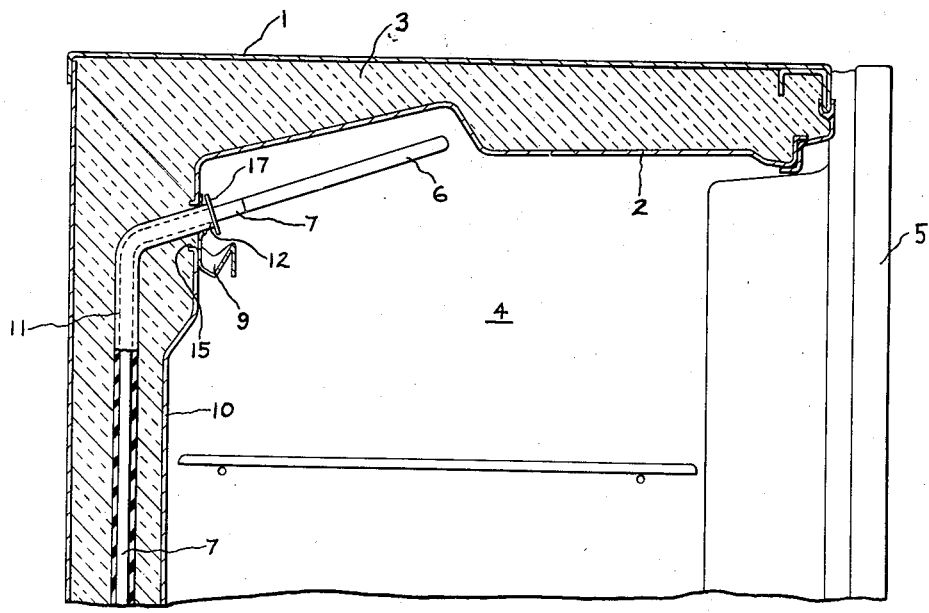

Jan. 6, 1959

K. A. ROBBIE 2,867,095

REFRIGERATOR CABINET

Filed Oct. 14, 1957

INVENTOR.
KENNETH A. ROBBIE

BY *Walter E. Rule*

HIS ATTORNEY

United States Patent Office 2,867,095
Patented Jan. 6, 1959

2,867,095

REFRIGERATOR CABINET

Kenneth A. Robbie, Louisville, Ky., assignor to General Electric Company, a corporation of New York Application October 14, 1957, Serial No. 689,880

2 Claims. (Cl. 62—285)

The present invention relates to refrigerator cabinets and is more particularly concerned with means for providing an effective seal about the refrigerant tubing passing through the walls of the cabinet defining a food storage compartment.

In the usual household refrigerator, the condensing unit component of the refrigerating system is mounted within a unit compartment below the food storage compartment and is connected to an evaporator disposed within the food storage compartment by refrigerant conduit means passing through the walls defining the food storage compartment. During normal operation of the system, frost tends to collect on the evaporator and on the portions of the conduit within and closely adjacent to the food storage compartment requiring periodic removal of the frost layer for maximum efficiency of the system. When this frost layer is melted, the defrost water tends to flow downwardly along any inclined surfaces of the refrigerant conduit, through the apertures provided for receiving the conduits as they pass through the compartment walls and into the insulation provided between the inner and outer walls of the cabinet. Since any water in the insulation decreases the insulating value thereof, it is most desirable that the space between the refrigerant conduits and the adjacent wall portions of the compartment be sealed to prevent migration of moisture to the insulation.

The present invention has as its principal object the provision of an effective seal between the walls of a storage compartment and the refrigerant conduit means of a refrigerating system passing through the wall which is of simple construction and which can be readily incorporated into the cabinet structure during the manufacture thereof.

A further object of the invention is to provide a cabinet including in combination with a drain trough for collecting defrost water dripping from an evaporator, means for preventing moisture from a defrosting evaporator from passing through the walls of the refrigerator cabinet and into the cabinet insulation.

Further objects of the invention will be pointed out with particularity in the claims annexed to and forming a part of this specification and the features of novelty which characterize the invention will be pointed out with particularity in the claims annexed to and forming part of this specification.

In accordance with the present invention, there is provided the usual refrigerator cabinet comprising an outer shell and an inner liner spaced from the shell and defining a food storage compartment. For the purpose of cooling the contents of the compartment there is provided an evaporator arranged within the food storage compartment; the evaporator being disposed in an inclined position so that during the defrosting thereof defrost water will flow downwardly along the evaporator surfaces and into a drain trough mounted on one wall of the compartment below the lower edge of the evaporator. The evaporator is connected by conduit means extending through a horizontal opening provided in the one wall of the compartment, which slot is closed by a vertical portion of the drain trough. In order to insulate the refrigerant conduit means and particularly the outlet line conduit, at least those portions adjacent to the point where the conduit means pass through the compartment wall are covered with a tubular resilient heat insulating covering having one end extending a short distance into the compartment. The vertical portion of the drain trough is provided with a slot for receiving the conduit and insulating covering and this slot includes spaced edge portions which, when the trough is placed in position to cover the opening in the compartment wall, engage portions of the tubular covering to compress the covering into close engagement with the conduit and with the drain trough. As additional means for preventing migration of defrost water along the conduit and into the insulated portions of the cabinet there is provided a shield on the conduit adjacent the end of the insulating tubular covering which extends below the covering and is designed to direct any defrost water downwardly into the trough positioned below the evaporator.

Figure 2:
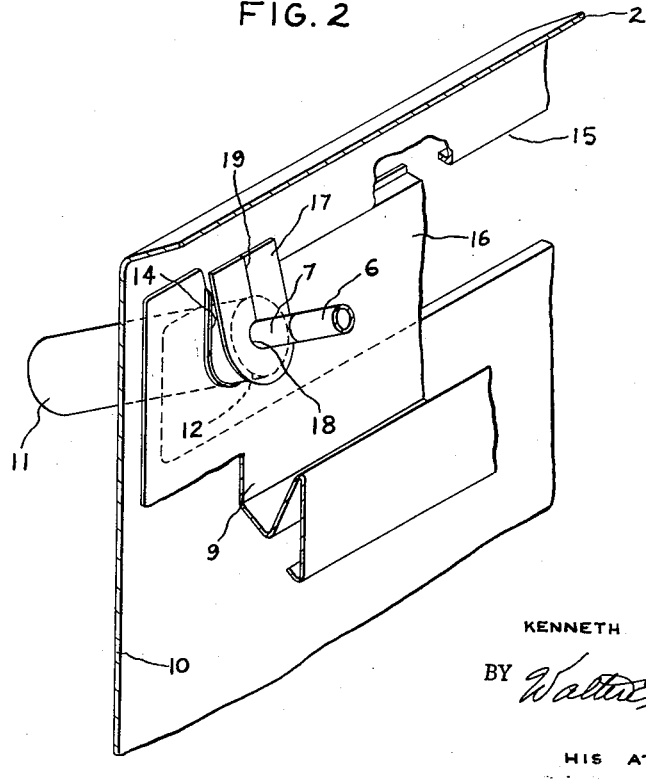

For a better understanding of the invention reference may be had to the accompanying drawing in which:

Fig. 1 is a side elevational view partially in cross section of a portion of the refrigerator cabinet embodying the present invention; and Fig. 2 is an enlarged perspective view of a portion of the cabinet of Fig. 1.

Referring to Fig. 1 of the drawing, there is shown a refrigerator cabinet comprising an outer shell 1 and an inner liner 2 spaced from the outer shell, the space between the two being filled with suitable heat insulating material 3. The inner liner 2 forms a food storage compartment 4, the access opening to which is closed by a door 5. Positioned within the upper portion of the food storage compartment 4 is an evaporator 6 which is connected by means of conduit means 7 to a condensing unit (not shown) positioned in a lower portion of the cabinet outside the storage compartment 4. The conduit means 7, only one of which is shown, serve to feed condensed refrigerant from a condensing unit to the evaporator and to withdraw vaporized refrigerant from the evaporator. In order that the refrigerator cabinet may be placed flat against a wall the conduit means 7 preferably pass through the insulation 3 between the outer shell 1 and the inner liner 2.

During operation of the refrigerator, a layer of frost will collect on the evaporator 6 and it is desirable periodically to remove this layer of frost in order to maintain the operation of the refrigerating system at maximum efficiency. Various means for defrosting the evaporator are known and will therefore not be described herein in detail. One well known method is to permit the evaporator 6 to reach a temperature above the melting point of ice during each "off" cycle so that any frost collecting on the evaporator during the previous "on" cycle will melt and flow from the evaporator 6. For drainage purposes the evaporator 6 is preferably arranged within the storage compartment 4 in a sloping or inclined position so that the defrost water will run down the surfaces of the evaporator 6 and collect in a trough 9 supported on the rear wall 10 of the inner liner below the lower edge of the evaporator 6.

During each "on" cycle, the evaporator 6 of course operates at temperatures below freezing. Therefore, those portions of the conduct means 7 connected to the evaporator 6 and closely adjacent thereto either within or outside the storage compartment 4 will also be at relatively low temperatures at which a layer of frost or moisture will collect thereon during the "on" cycle.

Since any moisture collecting on the portions of the conduit within the insulation 3 will be absorbed by the insulating material and thereby lower its insulation value, the conduit means within this region and substantially all of the conduit carrying low pressure refrigerant from the evaporator to the condensing unit is, in accordance with the present invention, provided with a tubular sheath or covering 11. This sheath 11 completely surrounds the conduit means 7 in order to prevent the condensation of moisture on the conduit means particularly within the area containing the insulation 3. A suitable material for this purpose is a resilient heat insulating material such as soft unicellular rubber as such a material is relatively impervious to moisture.

Further in accordance with the present invention and in order to prevent the defrost water flowing down the surfaces of the evaporator 6 from entering the insulated area of the cabinet, the tubular sheath 11 has its end 12 extending through the wall 10 and terminating within the inner compartment 4 and the drip trough 9 includes a slot 14 the side walls of which closely engage and partially compress the end 12 of the tubular covering both for the purpose of forcing the covering more firmly into engagement with the conduit means 7 at the point where it passes from the storage compartment into the insulated area and also to prevent any moisture collecting on the outside of the tubular element in the storage compartment from flowing down the outside thereof into the insulated area.

This construction will become more apparent by reference to Fig. 2. As is shown more clearly in this figure, the rear wall 10 of the inner liner includes a horizontally extended opening on slot 15 through which the evaporator 6 is inserted during the manufacture of the cabinet. As is more completely described in Patent 2,755,636, Horvay, the drip trough 9 includes a vertical portion 16 which overlaps and closes this slot 15 after insertion in the evaporator.

In accordance with the present invention, the slot 14 in this vertical portion 16 of the drain trough is so designed that when the drain trough is inserted into the cabinet, the slot 14 will encompass the tubular covering 11 on the conduit 7 and slightly compress the covering to provide a moisture proof seal around the conduit means 7 and between the tubular covering 11 and the adjacent portions of the drip trough 9.

As a further means for preventing moisture from flowing down the evaporator 6 and onto the conduit means 7 from entering the insulated area, there is also provided on the conduit a shield 17, which may conveniently be formed of a flexible plastic material. This shield includes an aperture 18 for encompassing the conduit means 7 adjacent the end 12 of the tubular covering 11 and a slot 19 extending from one edge of the shield 7 to the aperture 18 to facilitate mounting of the shield on the conduit 7. With the bottom portion of the shield extending below the covering 11, most of the moisture flowing onto the conduit 7 will contact the shield 17 and drop from the lower edge of the shield into the drip trough 9 positioned immediately below this portion of the structure.

While the present invention has been described with reference to a particular embodiment thereof, it will be understood that modifications may be made therein by those skilled in the art without actually departing from the invention. Therefore, the appended claims are intended to cover all such variations as come within the true spirit and scope of the invention.

What I claim as new and desire to secure by Letters Patent of the United States is:

1. A refrigerator comprising an outer shell and an inner liner spaced from said shell and defining a food storage compartment, an inclined evaporator disposed in said compartment for cooling the contents thereof, said liner including an opening in one wall thereof below said evaporator, conduit means extending through said opening for connecting said evaporator to a source of refrigerant, a tubular resilient heat insulating covering on said conduit means extending through said opening and terminating a short distance within said compartment, a drain trough disposed below said evaporator for collecting defrost water dripping from said evaporator, said trough including a vertical portion for closing said opening, said vertical portion having a slot therein for receiving said conduit means including said tubular covering, said slot including spaced edge portions for engaging and compressing the portions of said tubular covering in contact therewith.

2. A refrigerator comprising an outer shell and an inner liner spaced from said shell and defining a food storage compartment, an inclined evaporator disposed in said compartment for cooling the contents thereof, said liner including an opening in one wall thereof generally below said evaporator, conduit means extending through said opening for connecting said evaporator to a source of refrigerant, a tubular resilient heat insulating covering on the portions of said conduit means extending through said opening and terminating a short distance within said compartment, a drain trough disposed below said evaporator for collecting defrost water dripping from said evaporator, said trough including a vertical portion for closing said opening, said vertical portion having a slot therein for receiving said conduit means including said tubular covering, said slot including spaced edge portions for engaging and compressing the portions of said tubular covering in contact therewith, and a shield on said conduit adjacent the end of said covering and extending below said covering for preventing defrost water from said evaporator from contacting said covering.

References Cited in the file of this patent
UNITED STATES PATENTS

| | | |
|---|---|---|
| 2,209,866 | Whitney | July 30, 1940 |
| 2,484,588 | Richard | Oct. 11, 1949 |
| 2,614,398 | Goure | Oct. 21, 1952 |
| 2,755,636 | Horvay | July 24, 1956 |